United States Patent [19]
Yamamoto et al.

[11] Patent Number: 5,966,256
[45] Date of Patent: Oct. 12, 1999

[54] VEHICLE LAMP WITH REFLECTION MIRROR AND A METHOD OF FORMING THE SAME

[75] Inventors: Norimasa Yamamoto; Masahiro Maeda; Yuji Kuroiwa, all of Shizuoka, Japan

[73] Assignee: Koito Manufacturing Co., Ltd., Tokyo, Japan

[21] Appl. No.: 08/676,923

[22] Filed: Jul. 8, 1996

[30] Foreign Application Priority Data

Jul. 7, 1995 [JP] Japan ..................... 7-194130

[51] Int. Cl.⁶ ........................... G02B 5/08; G02B 5/10
[52] U.S. Cl. .................. 359/850; 359/851; 359/852; 359/853; 359/867; 359/868
[58] Field of Search ................. 359/850, 851, 359/852, 853, 867, 868; 362/197, 65, 66

[56] References Cited

U.S. PATENT DOCUMENTS

| 1,903,417 | 4/1933 | Grant | 362/304 |
| 4,417,300 | 11/1983 | Bodmer | 362/304 |
| 5,097,399 | 3/1992 | Gammache | 362/197 |

FOREIGN PATENT DOCUMENTS

| 334891 | 9/1930 | United Kingdom . |
| 2 262 980 | 7/1993 | United Kingdom . |

*Primary Examiner*—Cassandra Spyrou
*Assistant Examiner*—Mohammad Y. Sikder
*Attorney, Agent, or Firm*—Sughrue, Mion, Zinn, Macpeak & Seas, PLLC

[57] ABSTRACT

A fundamental surface for a reflection surface of a reflection mirror of a vehicle lamp is formed in a manner such that a curved surface where an insertion hole, through which a light source is inserted into the reflection mirror in the direction oblique to the optical axis of the reflection mirror, is to be formed, is made smoothly continuous to the remaining curved surface without any level-difference. A group consisting of a number of paraboloids of revolution with different focal distances are put on the fundamental surface, and a group of closed curves formed as intersecting lines of the fundamental surface and the group of paraboloids of revolution are determined. A number of reflection steps in the form of loop are formed on the reflection surface. The reflection steps between the adjacent ones of the closed curves are defined by portions of the paraboloid of revolution between the adjacent ones.

4 Claims, 9 Drawing Sheets

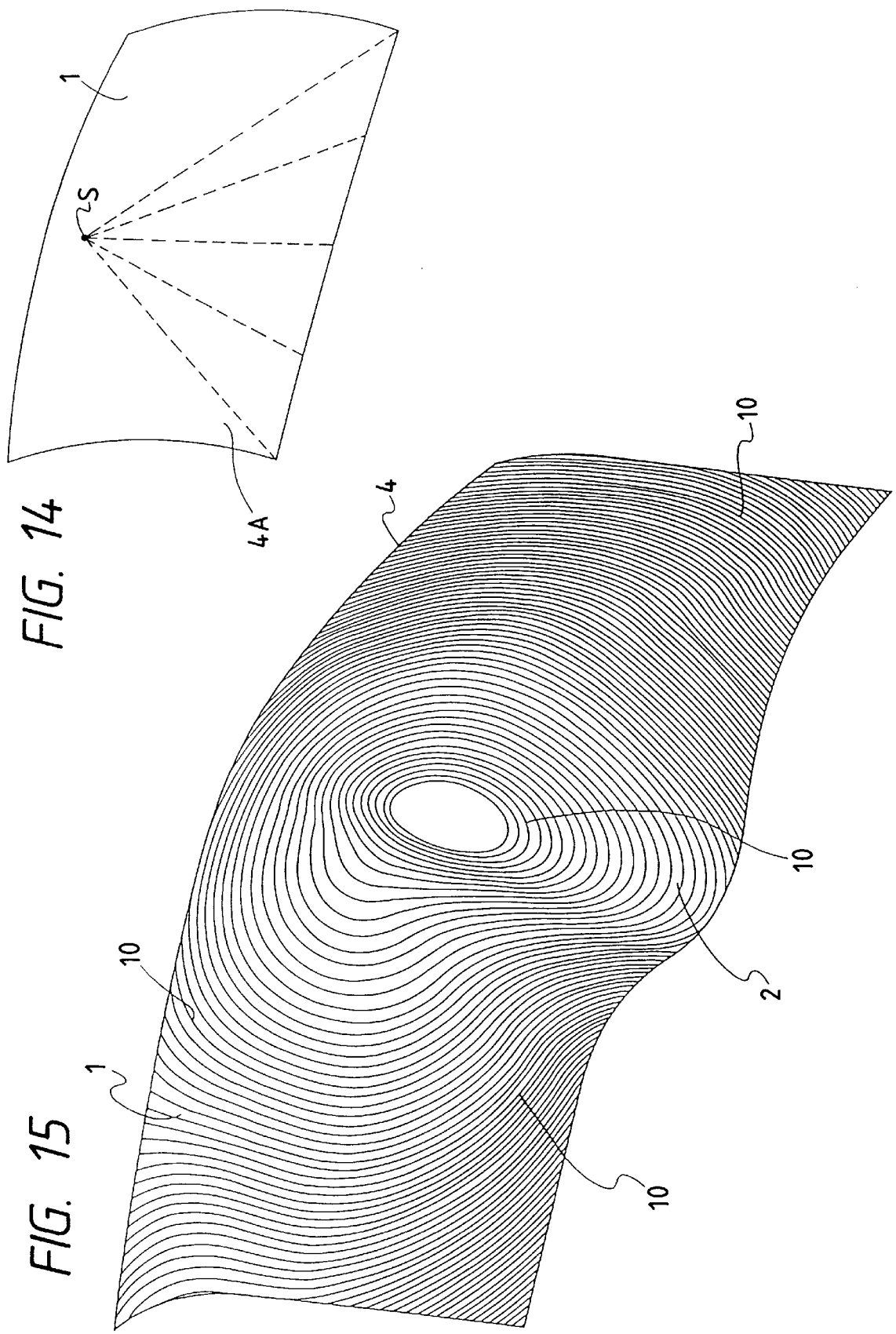

VEHICLE LAMP WITH REFLECTION MIRROR AND A METHOD OF FORMING THE SAME

BACKGROUND OF THE INVENTION

The present invention relates to a vehicle lamp with a reflection mirror such as a tail lamp, a stop lamp and a turn signal lamp, and a method of forming the same. More particularly, the invention relates to a vehicle lamp with a reflection mirror and a method of forming the same in which an insertion hole, through which a light source is inserted into the reflection mirror of the vehicle lamp in the direction slanted to the optical axis of the reflection mirror and placed in the reflection mirror, is formed in the reflection mirror. A portion of a curved surface of the reflection mirror where the insertion hole is to be formed is smoothly continuous to the remaining portion of the curved surface without any level-difference therebetween. Multi-loop reflection steps are formed over both the portions of the curved surface, whereby the portion of the curved surface where the insertion hole is to be formed may be used as a reflection surface effective for light distribution.

A vehicle lamp is constructed such that a light source is disposed in an internal space defined by a reflection mirror and a lens, and the reflection mirror includes an insertion hole through which a bulb is inserted into the internal space of the lamp.

Usually, the bulb insertion hole is formed in the central part of the reflection mirror, and the bulb is mounted on the reflection mirror such that the center axis of the bulb is in parallel with the optical axis of the reflection mirror. In the lighting device with a bulb thus mounted, the depth of the lighting device, viz., the size thereof when measured along the optical axis of the reflection mirror, tends to increase.

For example, in the case of a rear combination lamp or the like that is mounted on the back door of an automobile, to reduce the size of the lamp mounted thereon when viewed in the longitudinal direction of the automobile, the lamp is constructed such that a bulb is inserted into the internal space of the lamp through a lamp insertion hole that is formed in the bottom of the reflection mirror.

FIGS. 16 and 17 show an example of a conventional reflection mirror a used in such a vehicle lamp.

In the reflection mirror a, a reflection surface portion d is disposed between an upper surface portion b and a bottom surface portion c, and serves as an effective reflection surface. The inner surface of the upper surface portion b and that of the bottom surface portion c are both flat, and each is a non-reflection surface.

The bottom surface portion c includes a flat portion e that is located at the middle thereof. The flat portion e is higher than another flat portion f of the bottom surface portion c. One end of the flat portion e is continuous to the reflection surface portion d, while the other end thereof is continuous with respect to a slanted portion g and the flat portion f. Accordingly, a level-difference h is present between the flat portion e and the flat portion f.

As shown in FIG. 17, a bulb insertion hole i is formed in the flat portion e. A glass bulb k of a bulb j and a part of a socket portion l thereof are disposed in front of the reflection mirror. The bulb is inserted into the inner space through the bulb insertion hole i from the lower side of the mirror.

When the bulb j is inserted into the inner space through the bulb insertion hole i and is disposed in a direction orthogonal to the optical axis of the reflection mirror a, the width of the lamp when viewed in the direction of the optical axis of the reflection mirror a may be reduced. Further, formation of the flat portion e restricts the width of the lamp when viewed in the direction orthogonal to the optical axis of the reflection mirror a.

However, in the reflection mirror thus constructed, the flat portion e is provided for forming the bulb insertion hole i. With provision of the flat portion e, the slanted portion g stands out in the light projecting direction. Thus, the slanted portion g may make a shadow to the light from the bulb j. Also, light reflected on the slanted portion g may be diffused to make a light amount distribution irregular. These problems make it difficult to effectively use the reflection surface.

With provision of the flat portion e, there is the possibility that shadows n and n (shown by slanted lines), which correspond to both sides of the slanted portion g, appear on the surface of a lens m disposed at the front of the reflection mirror a. The shadows, if they appear, mar the look of the lamp. A solution to this problem is to configure steps o formed on the lens m so as not form the shadows n and n. Another solution is to additionally use an inner lens for the same purpose.

SUMMARY OF THE INVENTION

To solve the above problems, there is provided a vehicle lamp with a reflection mirror having a reflection surface including a number of reflection steps, one of the reflection steps, which is disposed between adjacent ones of closed curves formed as intersecting lines of a number of paraboloids of revolution with different focal distances and a fundamental surface of the reflection surface, being defined by a portion of the paraboloid of revolution disposed between the adjacent ones, the reflection mirror including the following structural features (1) to (3):

(1) an insertion hole, through which a light source is inserted into the reflection mirror in the direction oblique to the optical axis of the reflection mirror, is formed in the reflection mirror;

(2) a portion of the reflection surface where the insertion hole of the light source is to be formed is smoothly continuous to the remaining portion thereof without any level-difference therebetween; and (3) multi-loop reflection steps are provided over the entire reflection surface including both the portion where the insertion hole of the light source is to be formed and the remaining portion thereof.

According to another aspect of the invention, there is provided a method of forming the reflection mirror of the vehicle lamp described above, which includes the following steps (1) to (4):

(1) a curved surface portion where the insertion hole, through which the light source is inserted into the reflection mirror in the direction oblique to the optical axis of the reflection mirror, is to be formed, that portion is made smoothly continuous to the remaining curved surface portion without any level-difference, in the fundamental surface for the reflection surface;

(2) a group of a number of paraboloids of revolution with different focal distances are set;

(3) a group of closed curves formed as intersecting lines of the fundamental surface and the group of paraboloids of revolution are determined; and (4) a number of reflection steps are formed in the form of loop, one of the steps disposed between adjacent ones of the closed curves being defined by a portion of the paraboloid of revolution disposed between the adjacent ones.

According to the present invention, a portion of a reflection mirror where an insertion hole through which a light source is inserted into the reflection mirror in the direction oblique to the optical axis of the reflection mirror, is formed, the portion is made smoothly continuous to the remaining portion thereof without any level-difference. Therefore, a portion causing shadows against light from the light source or causing diffused reflection is not formed. Further, the multi-loop reflection steps are formed over the entire reflection surface including both the portion where the insertion hole is to be formed and the remaining portion. With this, the reflection light from both the portions serves as light effective in light distribution.

BRIEF DESCRIPTION OF THE DRAWINGS

FIGS. 3(a) and 3(b) are diagrams for explaining a continuity at the boundary between the curved surface portion of the fundamental surface where the light source insertion hole is to be formed, and the curved surface of FIG. 1, in which FIG. 3(a) is a front view and FIG. 3(b) is a schematic view showing the radii of curvature at the boundary;

FIG. 14 is a perspective view showing a curved surface generated by connecting together the triangular planes of FIG. 13 with smooth contiguity;

FIG. 15 is a perspective view showing an example of layout of closed curves on the curved surface;

DETAILED DESCRIPTION OF THE INVENTION

A reflection mirror of a vehicle lamp and a method of forming the same according to the present invention will be described with reference to the accompanying drawings.

The reflection mirror of a vehicle lamp according to the present invention is formed in a manner such that multi-loop reflection steps, not intersecting one another, are formed on a curved surface in which a portion where a light source insertion hole is to be formed is smoothly continuous with respect to the remaining portion in a fundamental surface.

FIGS. 1 through 5 show a method of forming the fundamental surface.

Figure 1:
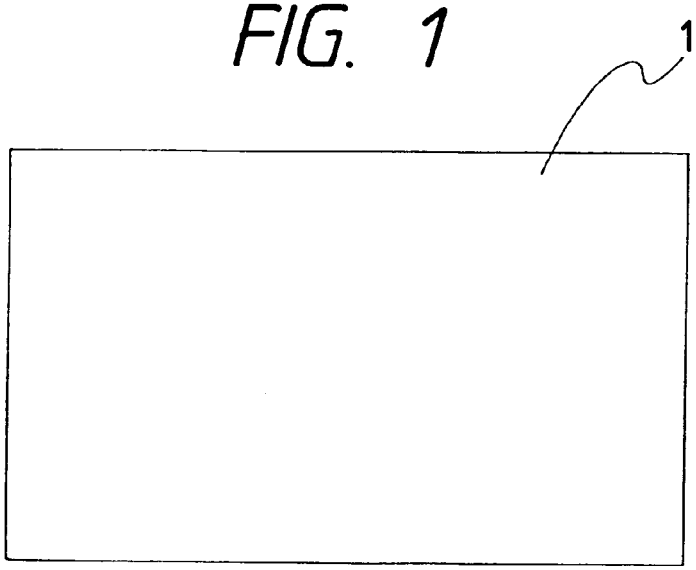
FIG. 1, together with FIGS. 2–5, is a diagram for explaining a method of forming a fundamental surface of a reflection surface according to the present invention, and specifically a front view showing a curved surface as the base of the fundamental surface.

First, as shown in FIG. 1, a curved surface 1 as the base of a reflection surface is prepared. A curved surface that can be analytically expressed by a mathematical equation, such as a paraboloid of revolution, may be used for the curved surface 1. However, it is a common practice that the curved surface 1 is formed as a free curved surface (i.e., cannot be analytically expressed easily by a mathematical equation) by a CAD (computer aided design) system.

Figure 2:
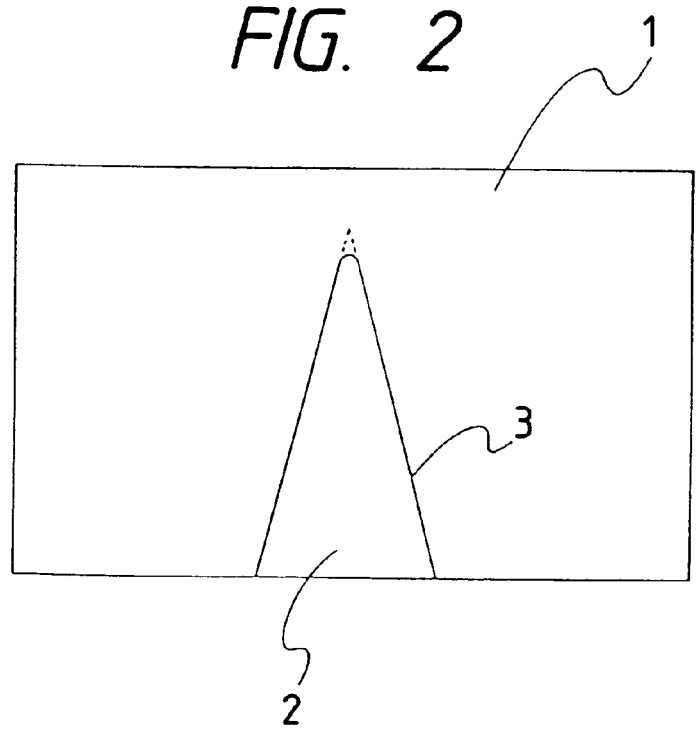
FIG. 2 is a front view showing a relative disposition of a curved surface portion of the fundamental surface where a light source insertion hole is to be formed, and the curved surface of FIG. 1.

A curved surface 2, which is to be used as a portion where an insertion hole through which a light source is inserted, is set on the curved surface 1, as shown in FIG. 2. The curved surface 2 may be a substantially conical surface, for example. An intersecting line 3 of the curved surface 2 and the curved surface 1 takes the form like an isosceles triangle when viewed from the front.

If the curved surface 1 and the curved surface 2 are merely continuous at the intersecting line 3, a level-difference will be present between them. The level-difference causes shadows against light from the light source. To avoid this, it is necessary that the curved surface 1 is smoothly continuous with respect to the curved surface 2.

Figure 3A:
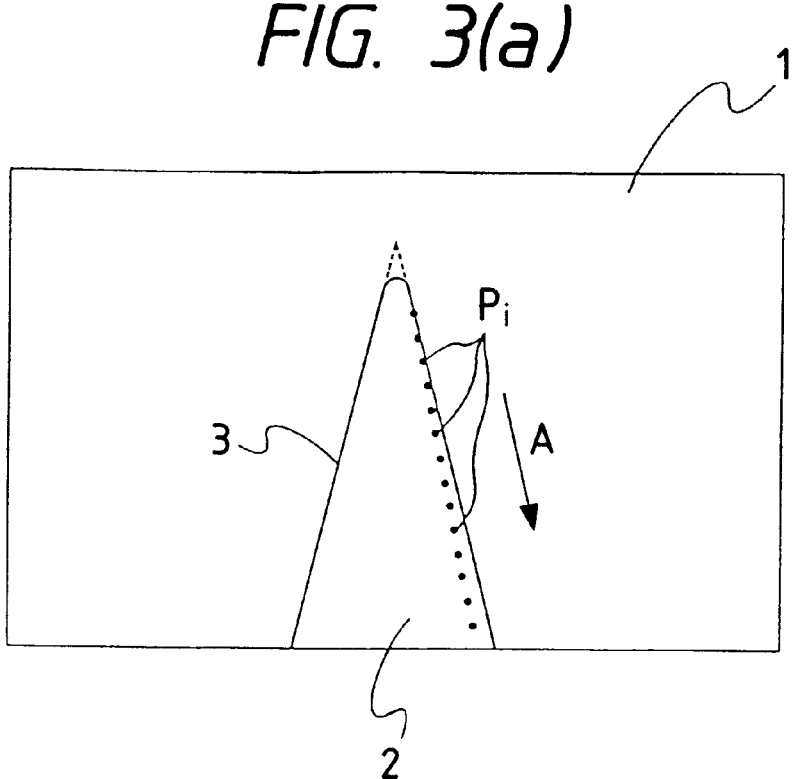
Figure 3B:
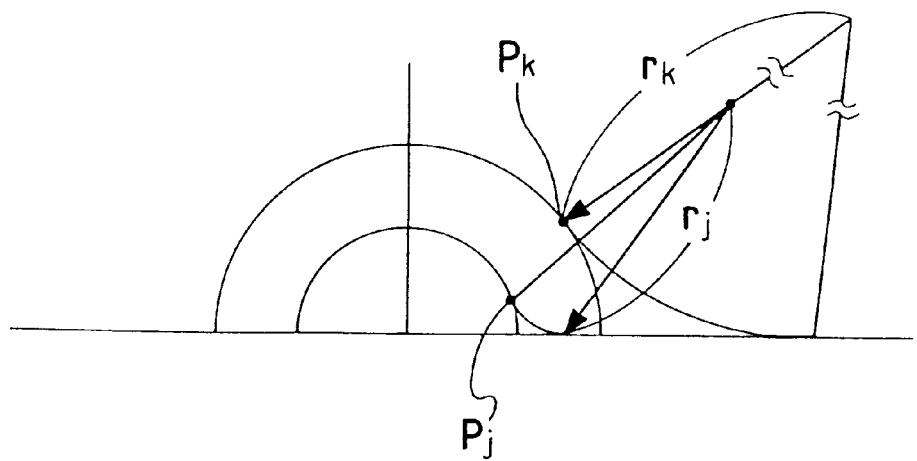

A process to form the smooth and continuous connection of the curved surfaces will be described. Connection points $P_i$ ($i=1, 2, \ldots$, and its value increases with increase of a distance from the vertex of the curved surface 2) to the curved surface 1 are set on the curved surface 2, as shown in FIG. 3(a). When using such a shape, it is preferable that at the connection points $P_i$, the radius of curvature increases with increase of the suffix $i$ of P given the conical shape of the curved surface 2, curves defining the cross sections, which are formed by truncating the conical surface by planes orthogonal to the axis of the cone defined by the conical surface 2, increases in its radius of curvature with increase of a distance between the cross section and the vertex of the cone, as shown in FIG. 3(b) ($r_j < r_k$ when radii of curvature at points $P_j$ and $P_k$ ($j<k$) are denoted by $r_j$ and $r_k$, respectively). To secure a more smoothly continuous connection of the curved surfaces 1 and 2, it is preferable that at each connection point, the radius of curvature of the curved surface 1 continuous to the curved surface 2 is increased in the direction of an arrow A shown in FIG. 3(a).

Figure 4:
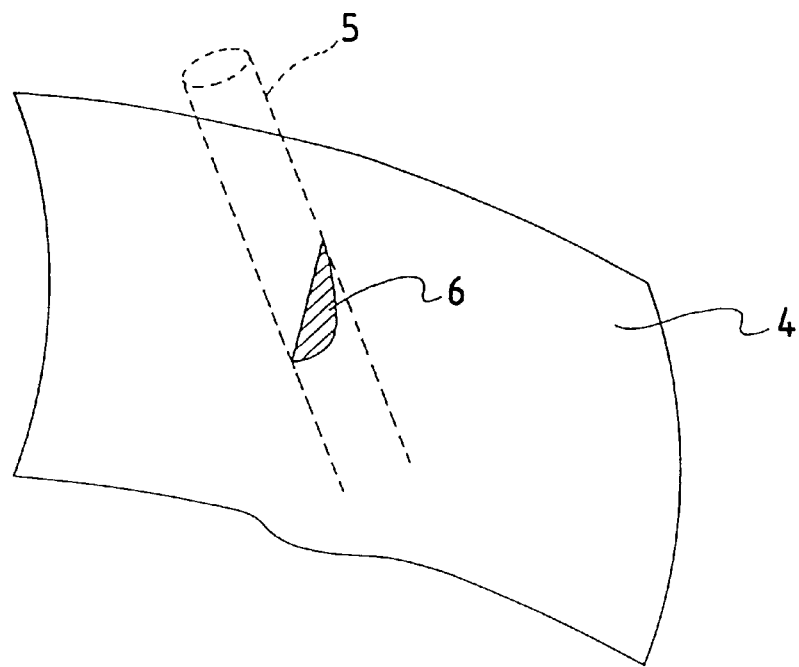
FIG. 4 is a perspective view showing how to form the light source insertion hole in the fundamental surface.

With reference to FIG. 4, a curved surface 4 as the base of the reflection surface is formed in the following way.

Thereafter, an insertion hole through which a light source is inserted is formed.

Figure 5:
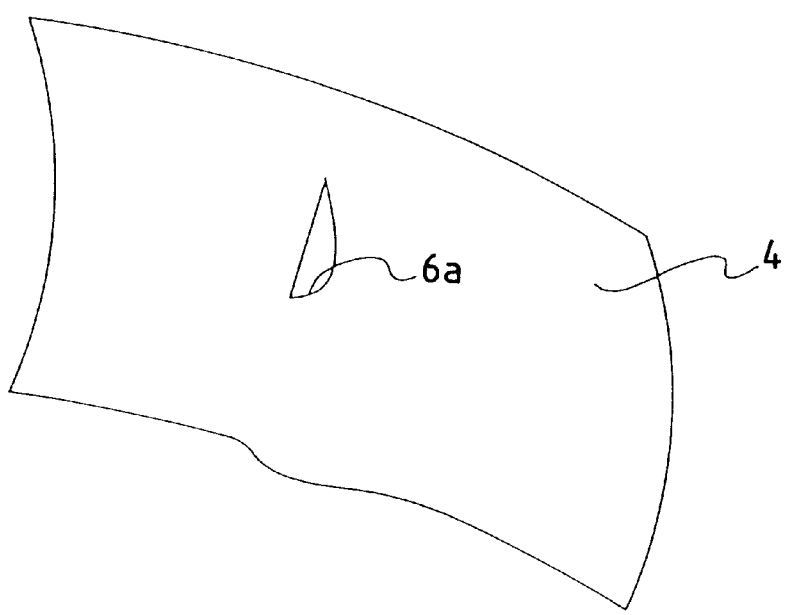
FIG. 5 is a perspective view showing the fundamental surface with the light source insertion hole formed therein.

First, a portion 6 (shown by shaded lines in the figure), where a phantom circular cylinder 5 (indicated by a broken line) intersects the curved surface 4, is cut out to form a light source insertion hole 6a, as shown in FIG. 4. Preferably, the axis of the cylinder is slanted to the vertical. By the process, the light source insertion hole 6a is formed in the middle of the curved surface 4, as shown in FIG. 5.

Next, a process to form loop-like reflection steps on the curved surface 4 will be described with reference to FIGS. 6 through 9. The process to form the light source insertion hole 6a in the curved surface 4 may follow the process to form the loop-like reflection steps. The description to follow will be given on the assumption that the light source insertion hole 6a is not yet formed in the curved surface 4, for ease of explanation.

Figure 6:
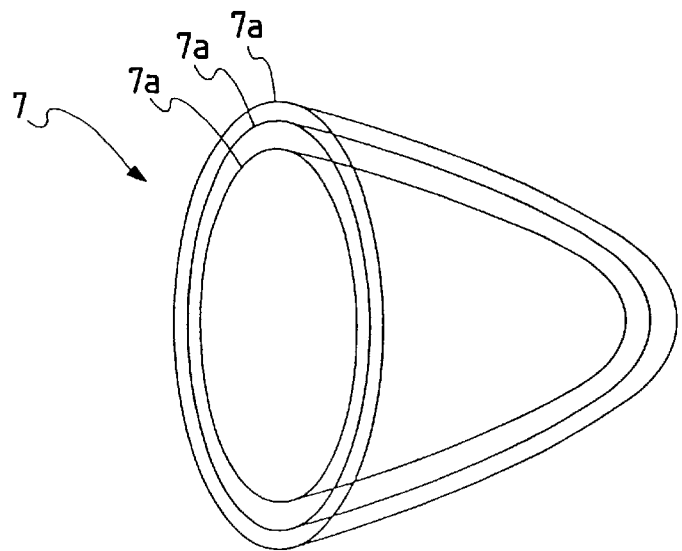
FIG. 6, together with FIGS. 7 to 9, is a diagram for explaining a method of forming multi-loop reflection steps on the fundamental surface of FIG. 5, and specifically a perspective view showing a group of paraboloids of revolution.

A group of curved surfaces 7, which are selected to define the performance of the reflection surface, are prepared as shown in FIG. 6. The group of curved surfaces 7 are composed of a number of paraboloids of revolution 7a, 7a, . . . having a common rotational symmetric axis and different focal distances. Those paraboloids of revolution 7a are selected so as not to spatially intersect.

Figure 7:
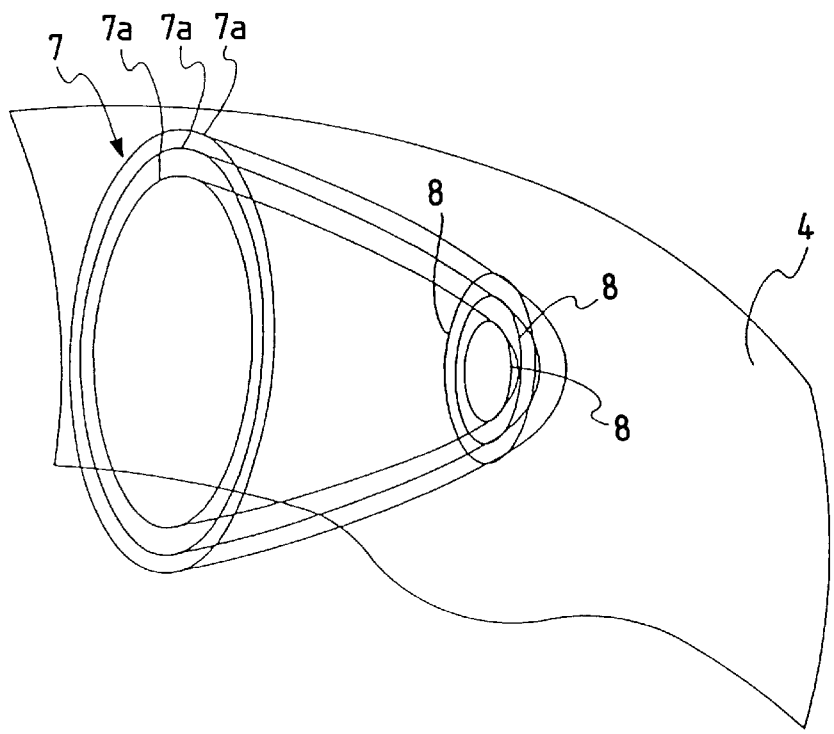
FIG. 7 is a perspective view showing a group of closed curves formed as intersecting lines of the paraboloids of revolution and the fundamental surface.

Intersecting lines 8, 8, . . . , which are formed at the intersection of the curved surface 4 and the group of curved surfaces 7, are determined as shown in FIG. 7. These intersecting lines 8 are each a closed curve or a part of a closed curve and never intersect one another on the curved surface 4. The center of a group of the closed curves, consisting of the intersecting lines 8, is positioned at an intersecting point of a rotational symmetric axis and the curved surface 4, when the curved surface has the rotational symmetry axis. When the curved surface does not have a rotational symmetry, the center is determined by the position of a point where one paraboloid of revolution of the group of the paraboloids of revolution contacts with the curved surface 4.

Figure 8:
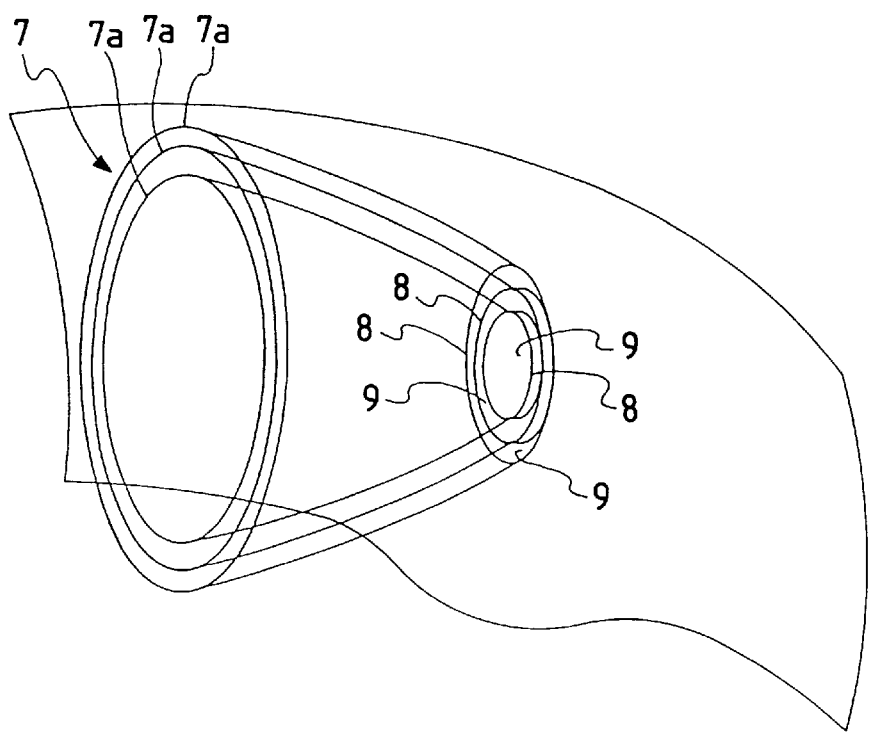
FIG. 8 is a perspective view for explaining how to form the reflection steps.

After the intersecting lines 8 are determined, reflection steps are formed using the intersecting lines. As explained subsequently, the respective reflection steps 9, 9, . . . , that are formed between adjacent ones of the intersecting lines, are defined by portions of the paraboloid of revolution between the adjacent intersecting lines as shown in FIG. 8.

Figure 9:
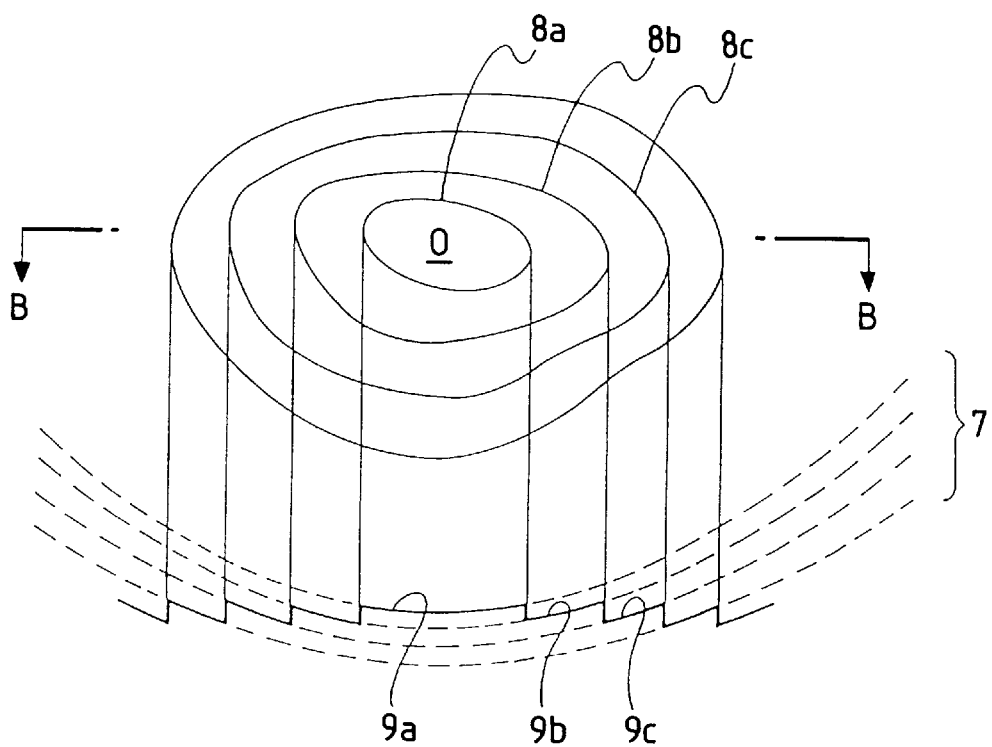
FIG. 9 is a view showing front profiles of the closed curves and cross sections of reflection steps.

A front view of the intersecting lines is given in the upper part of FIG. 9, and a cross sectional view taken on line B and B in the front view is given in the lower part of FIG. 9. The intersecting lines on the curved surface 4 are denoted as 8a, 8b, 8c, . . . in an order taken from the inner side of the closed curve group, close to the center O, and extending to the outer side thereof. These intersecting lines will appear as the boundary lines of the reflection steps 9. In the figure, broken lines indicate the group 7 of the paraboloids of revolution. The configurations of the reflection steps are determined in such a way that a reflection step 9a is formed in an area defined by the intersecting line 8a; a reflection step 9b is formed in an area between the intersecting lines 8a and 8b; and a reflection step 9c is formed in an area between the intersecting lines 8b and 8c. The reflection step surfaces, respectively, are formed as parts of the paraboloids of revolution with different focal distances. The reflection surface having the reflection steps thus formed, when viewed in cross section, takes a saw-toothed or serrate profile.

After the multi-loop reflection steps are thus formed on the reflection surface, CAD data for forming a mold of the reflection mirror can be gathered using such a reflection surface having the reflection steps.

In the description thus far made, the curved surface 4 as the base of the reflection surface is formed in a manner such that the curved surface 1 and the curved surface 2 are made smoothly continuous at the boundary therebetween. Alternatively, a process to bury the curved surface 2 into the curved surface 1 as shown in FIGS. 10 to 14 may form a new curved surface.

Figure 10:
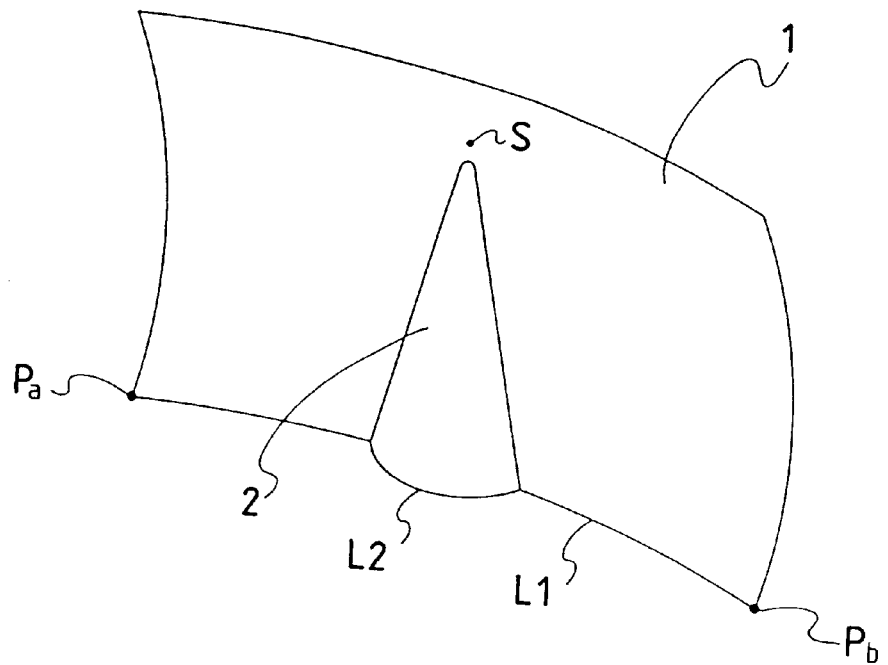
FIG. 10, together with FIGS. 11 to 14, is a diagram for explaining another method of forming a fundamental surface of a reflection surface according to the present invention, and specifically a perspective view showing a curved surface as a base of the fundamental surface and a curved surface of a portion where a light source insertion hole is to be formed.
Figure 11:
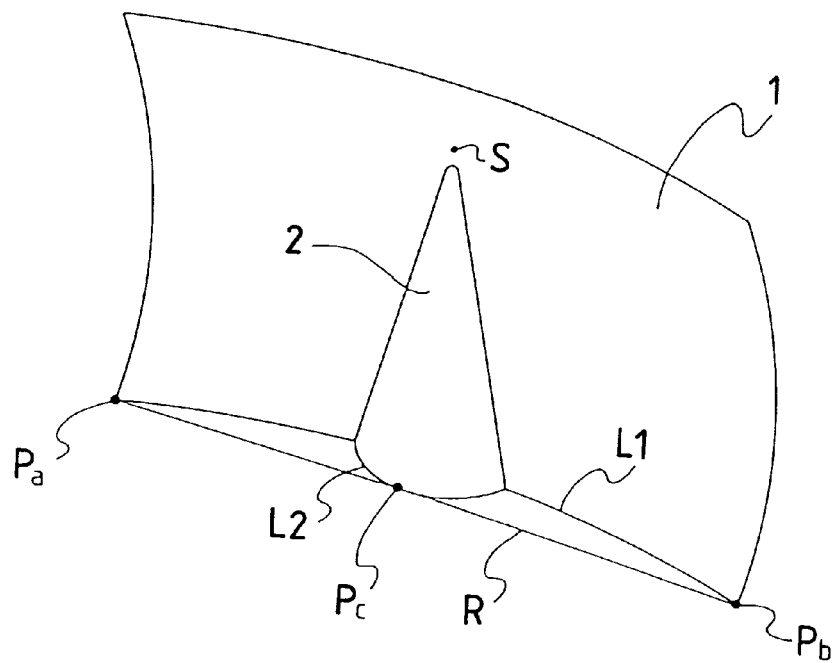
FIG. 11 is a perspective view showing a process to draw an arc through two points at both ends of a lower boundary curve as the base of the fundamental surface, the arc contacting with the curved surface of the portion where the light source insertion hole is to be formed.

That is, first, the curved surface 1 and the curved surface 2 are prepared as shown in FIG. 10. As shown in FIG. 11, an arc R is drawn through points Pa and Pb at both ends of a lower boundary curve L1 of the curved surface 1 to contact with a lower boundary curve L2 of the curved surface 2 at a point Pc contained therein. In the figure, a point S indicates the vertex of the curved surface 2, located behind the curved surface 1.

Figure 12:
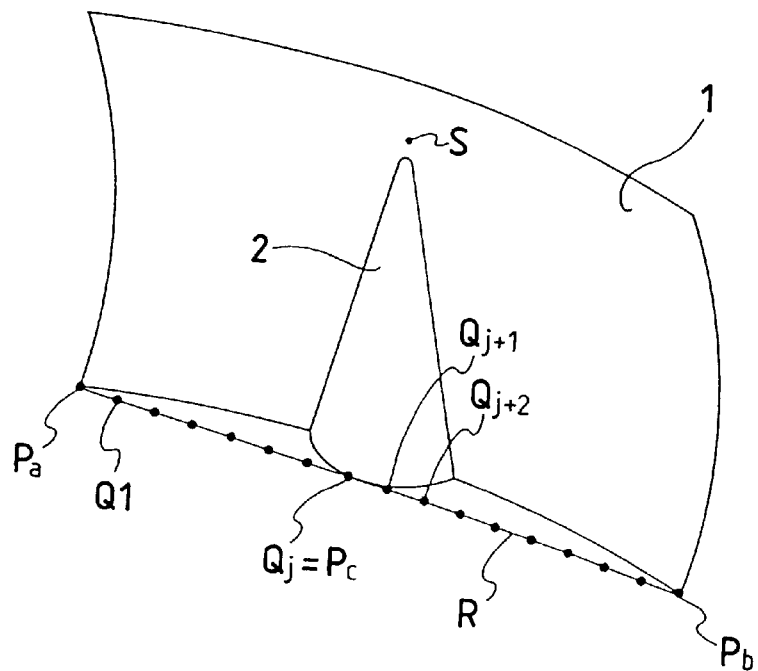
FIG. 12 is a perspective view showing the arc of FIG. 11 with a number of division points put thereon.

As shown in FIG. 12, division points Qi (i=1, 2, . . . , and its value increases in the direction from the point Pa to Pb, and a point Qj coincides with the point Pc) are put on the arc R, to divide the arc R into a number of line segments. The arc R may be divided at regular intervals or divided equi-angularly with respect to a reference point such as the center of curvature of the arc R or the point S. However, it may not be always equally divided.

Figure 13:
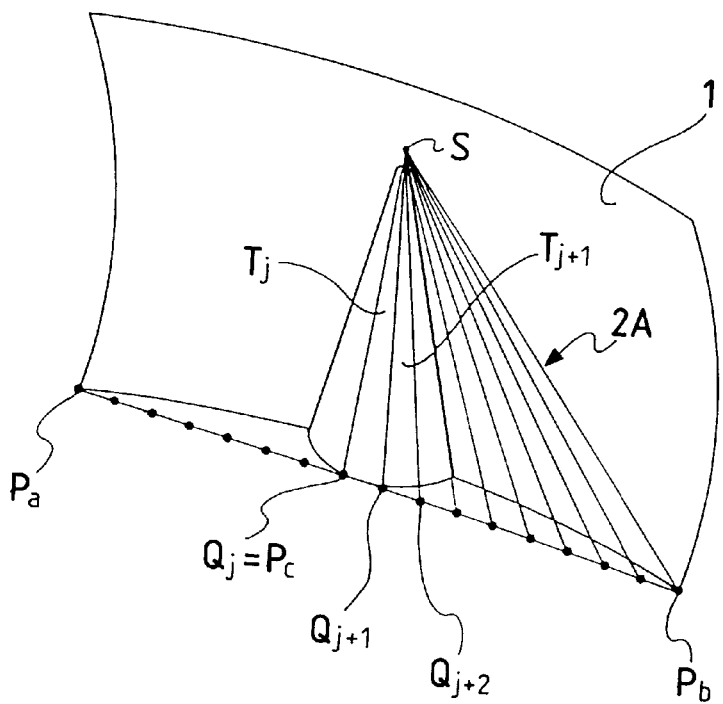
FIG. 13 is a perspective view showing how to form triangular planes defined by the vertex of the portion where the light source insertion hole is to be formed and the division points on the arc.
Figure 16:
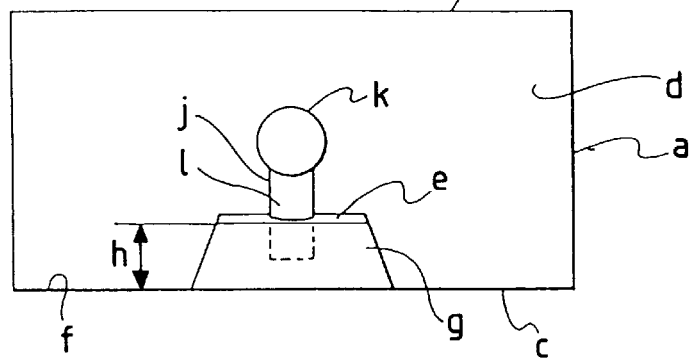
FIG. 16, together with FIG. 17, schematically illustrates a conventional reflection mirror of a vehicle lamp, and specifically is a front view of the reflection mirror.
Figure 17:
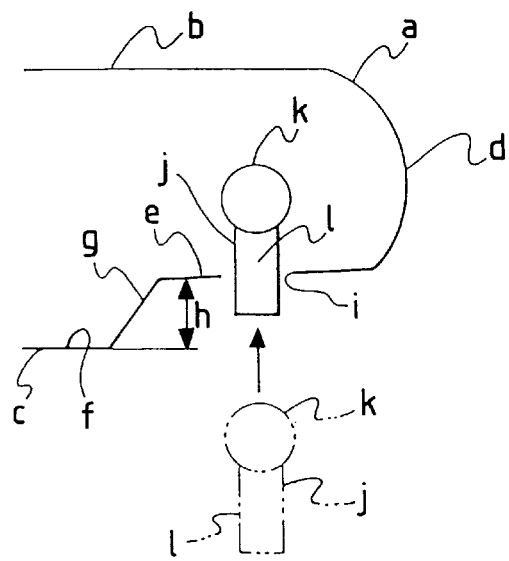
FIG. 17 is a longitudinal sectional view of the conventional reflection mirror, taken on the center line.
Figure 18:
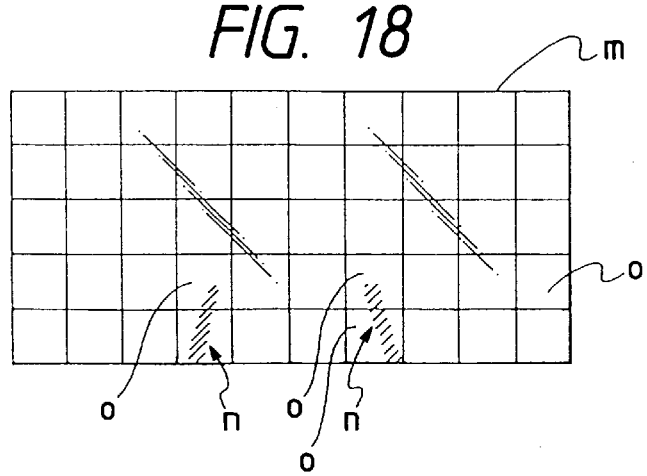
FIG. 18 is a diagram for explaining the problems of the conventional reflection mirror.

Subsequently, substantially triangular planes defined by all of the division points Qi on the arc R and the point S, as shown in FIG. 13, are formed in the following manner. A triangular plane Tj is formed having the vertices of the point S, and the point Pc (=Qj) and its adjacent point Qj+1. Another triangular plane Tj+1 is formed having the vertices of the point S, and the point Qj+1 and its adjacent point Qj+2.

The thus formed triangular planes are jointed together to form a composite plane 2A. To smoothen the composite plane further, the tangential lines and the curvatures at the boundary lines are processed for securing smooth contiguity. The resultant curved surface 4A is in harmony with the curved surface 1 (broken lines indicate the boundary lines that disappeared), and smoothly continuous over its entire surface as shown in FIG. 14.

In the same way as seen in FIGS. 4 and 5, a light source insertion hole 6a may be formed in the curved surface 4A by cutting out a portion enclosed with the intersecting lines of the curved surface 4A and a phantom circular cylinder 5.

For the formation of the remaining reflection steps, the procedure described referring to FIGS. 6 to 9 may be used, and hence no further description thereof will be given here.

As described above, in the method of forming a reflection surface according to the present invention, a portion of the reflection surface where a light source insertion hole is to be formed is made smoothly continuous to the remaining portion thereof, to thereby eliminate a level-difference that otherwise would be formed between them. Reflection steps formed between the adjacent ones of those closed curves formed as the intersecting lines of a group of paraboloids of revolution and the reflection surface, are defined by portions of the paraboloid of revolution. Accordingly, the portion of the reflection surface where the light source insertion hole is to be formed may be actively used as one of the objects to be controlled for light distribution.

FIG. 15 is a diagram showing an example of a configurative feature of the curved surface formed by the method of the invention, viz., an example of the layout of closed curves on the curved surface 4.

As shown, the closed curves are distributed on the curved surface 4, in the form of a finger mark. The closed curves, which are located in the central portion of the curved surface 4 where the light source insertion hole is to be formed, are elliptic. The closed curves are considerably distorted in the vicinity of the boundary of the curved surface 1 and the curved surface 2.

A boundary line that is visually recognizable is not present between the curved surface 1 and the curved surface 2. The closed curves 10, 10, . . . are distributed over the entire curved surface including the curved surface 1 and the curved surface 2, while not intersecting one another. Accordingly, no level-differences are formed in the paths of the reflection steps formed on the reflection surface using the paraboloids of revolution between the closed curves 10.

Rays of light reflected on the curved surface 2 where the light source insertion hole is to be formed are substantially parallel to the optical axis. Accordingly, the curved surface 2 may be used as a reflection surface that is effective for light distribution.

The reflection mirror constructed such that the light source is inserted into the reflection mirror through the light source insertion hole 6a formed in the curved surface 2, from the lower side of the mirror, has been described. It is evident that the present invention is applicable to any reflection mirror if it is constructed such that the light source is inserted into the reflection mirror in the direction oblique to the optical axis of the reflection mirror, and put at a predetermined location in the reflection mirror. The central portion of the closed curve group is not always coincident in position with the light source insertion hole. The following cases often happen. The central portion of the closed curve group is off the light source insertion hole. The closed curve group has a plural number of central portions. The closed curve group fails to have a clear central portion.

As seen from the foregoing description, in a reflection mirror of a vehicle lamp and a method of forming the same, which are provided according to the present invention, a portion of a reflection surface where a light source insertion hole through which a light source is inserted into the reflection mirror in the direction oblique to the optical axis of the reflection mirror, is formed, is made smoothly continuous to the remaining portion thereof without any level-difference, to thereby eliminate the portion causing a shadow against light from the light source and causing the diffused reflection. Further, the multi-loop reflection steps are formed over the entire reflection surface including both the portion where the light source insertion hole is to be formed and the remaining portion. With this, the reflection light from both the portions can be used as light effective in light distribution. Consequently, the present invention succeeds in improving the efficiency of utilizing luminous flux, eliminating shadows appearing on the lens located in the front of the reflection surface, and providing a good look of the lamp.

While the present invention has been described with respect to certain preferred embodiments, it is not limited thereto. One of ordinary skill in the art would understand the numerous modifications that could be made to those embodiments. Accordingly, the present invention is to be defined in accordance with the full scope of the claims set forth herein, as understood by one of ordinary skill in the art.

What is claimed is:

1. A vehicle lamp comprising a reflection mirror having an optical axis, said reflection mirror comprising:

a reflection surface defined by a fundamental surface;

an insertion hole, through which a light source is insertable into said reflection mirror, being formed in said reflection mirror in a direction oblique to said optical axis of said reflection mirror; and wherein a portion of said reflection surface where said insertion hole is to be formed being smoothly continuous with respect to the remaining portion of such reflection surface without any level-difference therebetween, wherein said reflection surface comprises:

a plurality of reflection steps, at least one of said plurality of reflection steps, which is located between adjacent ones of closed curves formed as intersecting lines of a plurality of paraboloids of revolution with different focal distances and said fundamental surface of said reflection surface, being defined by a portion of the paraboloid of revolution between said adjacent ones of closed curves.

2. The vehicle lamp as recited in claim 1 wherein said reflection steps are provided over said reflection surface including both said portion where said insertion hole is to be formed and said remaining portion thereof.

3. The vehicle lamp as recited in claim 1 wherein said reflection steps are formed as multiple loops.

4. The vehicle lamp as recited in claim 1 wherein said fundamental surface is a free surface.

* * * * *